United States Patent [19]
Seitz

[11] Patent Number: 5,377,329
[45] Date of Patent: Dec. 27, 1994

[54] REDUCING DATA TRANSMISSION BY INDEXED CACHING

[75] Inventor: Gregory W. Seitz, San Jose, Calif.

[73] Assignee: Apple Computer, Inc., Cupertino, Calif.

[21] Appl. No.: 172,015

[22] Filed: Dec. 21, 1993

Related U.S. Application Data

[63] Continuation of Ser. No. 785,139, Oct. 30, 1991, abandoned.

[51] Int. Cl.⁵ .............................................. G06F 13/00
[52] U.S. Cl. .................................... 395/250; 364/239; 364/600; 364/243.41; 364/DIG. 1
[58] Field of Search ........................ 395/250, 200, 425; 370/60

[56] References Cited

U.S. PATENT DOCUMENTS

| | | | |
|---|---|---|---|
| 4,074,232 | 2/1978 | Otomo et al. | 371/32 |
| 4,168,469 | 9/1979 | Parikh et al. | 395/200 |
| 4,414,620 | 11/1983 | Tsuchimoto et al. | 395/200 |
| 4,920,534 | 4/1990 | Adelmann et al. | 395/250 |
| 5,247,616 | 9/1993 | Berggren | 395/200 |

Primary Examiner—Gopal C. Ray
Attorney, Agent, or Firm—Mark Aaker

[57] ABSTRACT

This invention relates to an apparatus and method for reducing the transmission of data on a data communications network by obtaining data from a cache rather than by transmitting the data. This method maintains an indexed cache of data from previous transmissions. Then, when duplicate information is to be transmitted, it can be replaced by a flag and an index to the cached data. This reduces the amount of data to be transmitted and increases the apparent rate of transfer.

4 Claims, 3 Drawing Sheets

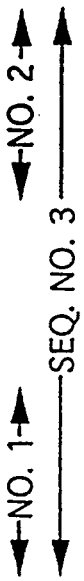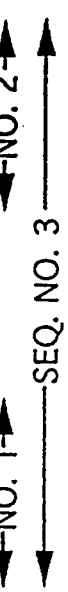

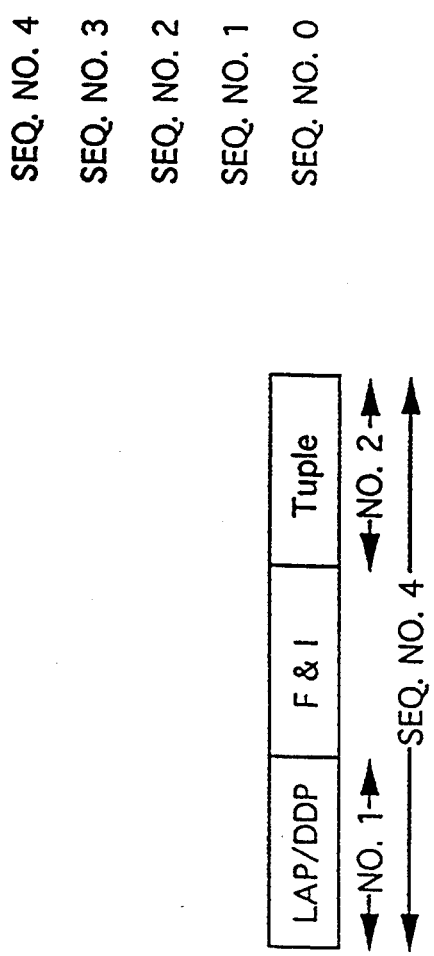
FIG. 4B
FIG. 4A
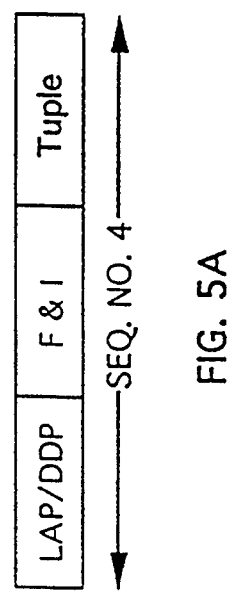
FIG. 5B
FIG. 5A

REDUCING DATA TRANSMISSION BY INDEXED CACHING

This is a continuation of application Ser. No. 07/785,139 filed Oct. 30. 1991, now abandoned.

BACKGROUND OF THE INVENTION

This invention relates to a method for reducing the transmission of data on a data communications network by obtaining data from a cache rather than by retransmitting the data.

It is often the case that duplicate or near-duplicate information is transmitted between a sender and receiver during a communications session. Many communications protocols use packets of data which have largely identical header information for each packet. This provides a redundancy that can be eliminated in order to reduce the amount of data transmitted, thereby improving throughput and responsiveness of an interactive communication system.

SUMMARY OF THE INVENTION

This invention relates to an apparatus and method for reducing the transmission of data on a data communications network by obtaining data from a cache rather than by transmitting the data. As the sender prepares to transmit data, the sender flags data that should be stored into a cache at the receiver. Later, when duplicate information is to be transmitted, it is replaced by a flag and an index to the cached data. The receiver interprets the flag and extracts the stored data from its local cache. This reduces the amount of data to be transmitted and increases the apparent rate of transfer. These and other advantages are obtained by a method as described in the following specification, drawings, and claims.

BRIEF DESCRIPTION OF THE DRAWINGS

FIG. 2A shows the disassembly of the first AppleTalk NBP Lookup packet. (AppleTalk is a registered trademark of Apple Computer, Inc.)

FIG. 2B shows the contents of the indexed cache after the disassembly of the first packet as shown in FIG. 2A.

FIG. 3A shows the disassembly of the second AppleTalk NBP Lookup packet.

FIG. 3B shows the contents of the indexed cache after the disassembly of the second packet as shown in FIG. 3A.

FIG. 4A shows the disassembly of the third AppleTalk NBP Lookup packet.

FIG. 4B shows the contents of the indexed cache after the disassembly of the third packet as shown in FIG. 4A.

FIG. 5A shows the disassembly of the fourth AppleTalk NBP Lookup packet.

FIG. 5B shows the contents of the indexed cache after the disassembly of the fourth packet as shown in FIG. 5A.

DETAILED DESCRIPTION

Figure 1:
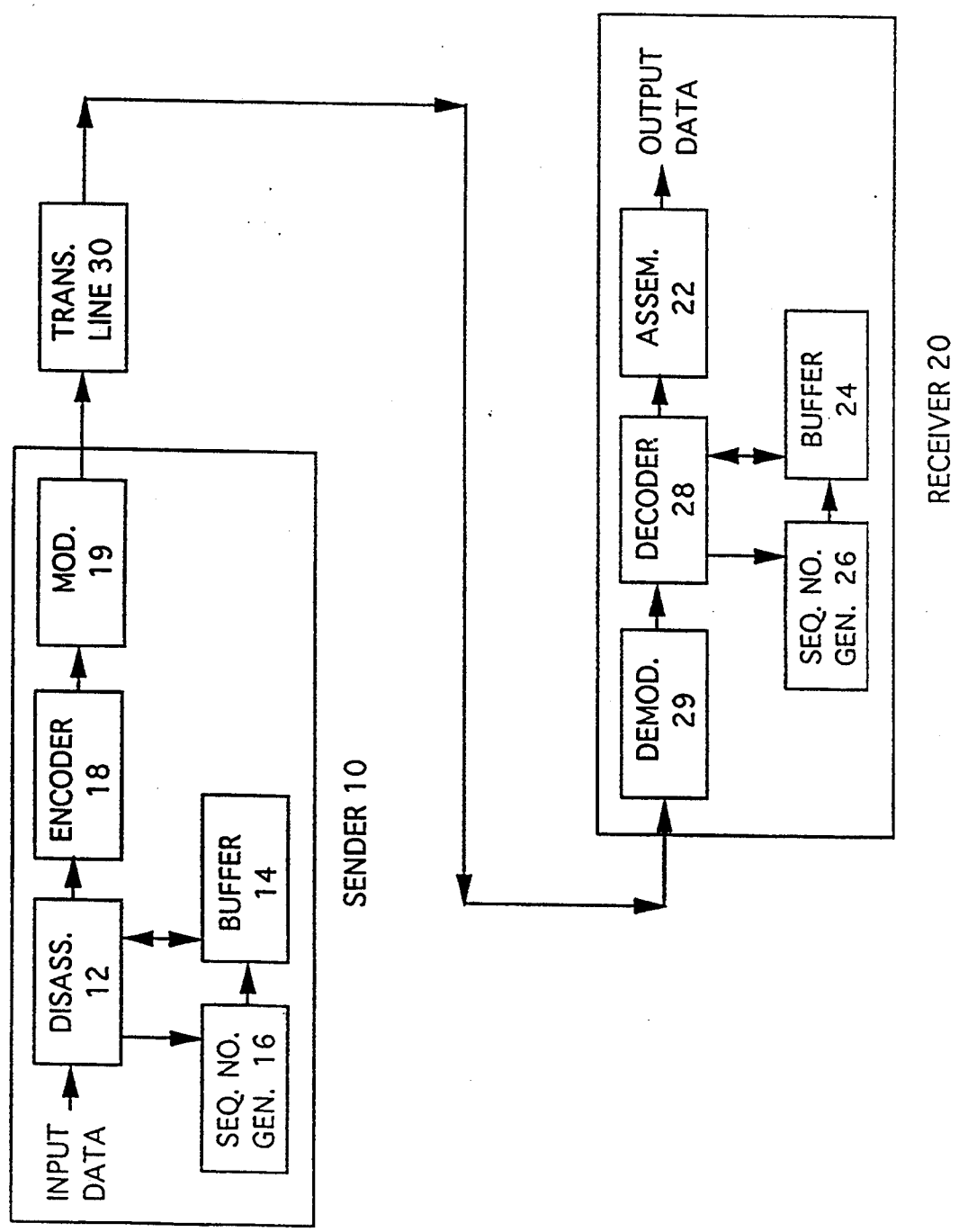
FIG. 1 shows a block diagram of a data communications sender and receiver with indexed caches in accordance with this invention.

FIG. 1 shows a block diagram of a data communications sender and receiver with indexed caches in accordance with this invention. A sender 10 and receiver 20 are connected by a reliable transmission line 30. Sender 10 and receiver 20 can be data communications equipment, or more generally can be computing devices such as personal computers or computer workstations. Transmission line 30 can be a dedicated point-to-point communications link such as a dial-up telephone line, or can be a multiple-access communication network.

Within sender 10 is a source of input data to be transmitted. This input data is processed at a a disassembly unit 12 to select sequences of input data to be stored in a sender buffer 14. All input data stored in sender buffer 14 is indexed by a sequence number generator 16. The sequence of data to be transmitted is then prepared by an encoder 18 and prepared for the characteristics of transmission line 30 by a modulator 19. Modulator 19 could be external to sender 10, as for example in a self-contained external modem.

Within receiver 20 is a demodulator 29 for receiving encoded data from transmission line 30. The encoded data is processed by a decoder 28 which recognizes flags which indicate special operations should be performed, such as data should be stored or recalled from a receiver buffer 24. Data stored in the receiver buffer 24 is indexed by a sequence number generator 26. Data from decoder 28, and stored data from receiver buffer 24 are combined in assembly unit 22 to create the output data stream to be used in receiver 20.

A method in accordance with this invention reduces repetitive data transmissions, such as packet headers or entire packets. The method can be tailored to recognize entire or partial sequences of information. The sender caches a specified amount of information from an input data stream and instructs the receiver to cache the same information. The sender then checks future data against that information for matches. If matches are found, a flag and token representing that data is put into the data stream instead of the actual data. Both flags, tokens and raw data can be mixed in the transmitted data stream.

At the receiver, the flags and tokens are interpreted as instructions to store or to extract information from the receiver cache, or to use the data directly from the transmitted data stream. The mixture of receiver cache data and raw data is assembled to produce an output data stream at the receiver identical to the input data stream at the sender.

This method relies on the states of the sender and receiver caches to be in sync. A simple implementation of this is to maintain identical caches at the sender and receiver, and to use a reliable transmission line or transmission service. This avoids great complexity in managing different cache sizes and indexing, and in identifying and recovering from transmission errors. This method requires that the sender and receiver remain synchronized when their caches are full, and when overflow or update procedures are used. Identical size caches can be used, which can be negotiated between the sender and receiver in an initial data communications exchange. The cache size that is used is the smaller of the two buffers, the sender buffer 14 and the receiver buffer 24. Using the smallest of the two buffers will ensure that both sides end up with the same size buffer, since the side with the larger buffer can always temporarily reduce the amount of buffer it provides. Of course, more complicated buffer management schemes can be used, so long as the caches and their indexes remain synchronized.

The choice of what data to cache and how to recognize it when looking for matches in subsequent data to be transmitted is entirely that of the sender. The sender determines how to transmit the data and how the data is cached. It sends flags to indicate to the sending side how to index, cache, and later recall the data from the buffer. Raw data is also transmitted for storage into the cache, and for use directly in the output data stream.

Essential to this invention are the techniques used to ensure that the sender and receiver buffers always remain in sync. As mentioned, a first step in ensuring this is to provide a method in which both sides can determine the proper size buffer to use. In order to do this they exchange their preferred buffer sizes. After getting the other's buffer size each chooses an actual buffer size that is the smaller of the two. Thus, if the sender had 10000 bytes of storage and the receiver had 8000 bytes of storage the resulting size would be the smaller of the two which is 8000 bytes. This ensures that every operation done to the sender's buffer can be exactly duplicated in the same buffer state on the receiving side after the same operation is carried out.

A second step to ensuring that both sides remain in sync is for them to provide a consistent way of adding to and removing items from the data cache. The method of storing data in this buffer must be the same on both sides. A preferred implementation organizes the buffer as a ring buffer. Each entry, such as a packet, inserted into the buffer has the following format expressed in the C programming language:

```
typedef struct TPacketData
{
    long          right;      /* link for receive, cksumhead for send */
    long          left;       /* link for receive */
    unsigned short seqnum;    /* sequence number of this entry */
    unsigned short datalen;   /* length of data that follows */
    unsigned char databuf[];  /* data that follows is tacked on here */
} TPacketData, *TPPacketData;
```

In this implementation, a block of data added to the ring buffer must always fit without wrapping. In other words, if there is not enough room at the high end of the buffer to store the full block of data, the buffer must be wrapped back to the low end. This is done to simplify the mapping of data structures onto the data within the buffer, at the expense of slightly under utilizing the available space. It would be very cumbersome to deal with the data if part of it was in one place and the other part somewhere else. If there is not enough room to insert an entry, items are removed until enough space exists. It is important to remember that both the sender and the receiver must use the same approach to manage their buffers because they must always stay in sync, having the same buffer contents, indexed with the same sequence number values.

In this preferred implementation defined above, the "right" field is used to link together the checksum records that describe this block of data. The size of the entire record which includes the actual data must always be an even number of bytes. This is to ensure that subsequent entries will always have their headers aligned on even boundaries. Therefore, if the actual size of the record happens to be an odd number, one byte is added to the amount of space used in the cache.

In order to describe the data in this buffer in a tokenized format, a sequence number is stored with the data. This sequence number will be duplicated on the receiver side when it stores this data. It is crucial that the sender and receiver use the same technique to generate sequence numbers to ensure that both sides stay in sync. In order to do this, both sides always start at a sequence number of zero before any data is stored. For each new item inserted into the data buffer, a new sequence number is generated by adding one to the previous one.

In operation, starting at the sender, the input data, usually a packet, is disassembled and its related portions separated according to definitions known to the sender. After all of the partial data packets are added to the buffer, the entire packet may be added. Adding the entire packet last ensures that the receiver will be able to reconstruct the packet based only on previous information. If the entire packet was added first, it would be possible to have entries in the data that referenced the packet itself. If this were allowed to happen, the receiver would have no way of reconstructing the packet since the packet itself would be required.

In encoding, each packet always contains at least one datagroup. It may contain more than one datagroup. A datagroup is made up of a flag followed by data whose meaning can be discovered by decoding the flag. A datagroup is a subunit of the packet that can be used to mix different types of data. For example, it might be desirable to describe a packet by using both matched data using sequence numbers as well as new data that is sent in its raw format.

In a preferred form, in order to minimize the amount of data required to describe the information that follows the datagroup flag we have defined a compact representation of an unsigned short number. This compact representation is known as a compactnum and has the following characteristics: 1) If the high bit of the first byte (first is described as reading left to right within the packet) is set, then we mask off the high order bit to obtain the number. This means that if the value wanted is less than 128 it can be described in 1 byte. If the bit is not set, then the number is a two byte number, and the low order value of the number is obtained from the next byte. This numbering scheme limits the maximum value of a compactnum to 32767.

In the encoded data stream to be transmitted from the sender to the receiver, each datagroup is made up of a flag followed by data whose meaning can be discovered by decoding the flag. In a preferred implementation, the datagroup flag is a one byte value broken down into the following fields:

Bit 7: Fixup

This bit is set if the data after this flag is fixup data. This bit is only permitted to be set when used as the very first flag. When this bit is set the low order 6 bits represent the fixup code. This implementation has reserved codes 0 through 15 for future use. This code is used to special case certain protocol types and can be used to fix up parts of a packet that contain place holders to improve the odds of a hit when attempting to match entries. For example, someone may have a packet that typically has all of the same data except for 4 bytes somewhere in the middle of the packet. In this case it would be possible to substitute zeros for those for bytes when matching entries. You would then use the fixup code to describe the bytes that are to be written over those in the packet after the packet is re-assembled. It is likely that we will add a dynamic exchange of information before any data packets are sent that will allow the sender to describe the fixup codes that it uses, and how the receiver should interpret them.

Bit 6: Packet Data

This bit is set if the data in this packet is data. It is clear if it is an out of band message.

Bit 5: Tokenized

This bit is set if the data after this flag is a token. If it is a token, the sequence number of the token is in the word that follows (always a word, not a compactnum). If this bit is not set, it is assumed that raw data follows. The raw data is preceded by a compacted length value unless it is the last group of data in the packet. The last group of raw data in a packet is a special case in which the length can be derived from the amount of data remaining in the packet.

Bit 4: Last Group

This bit is set if the data that follows is the last group of data in the packet. This flag must be present in the last datagroup. If raw data is being described and this flag is set, the size of the data is calculated as specified above.

Bit 3: Range

This bit indicates whether or not the sequence number that follows describes a range or not. If the bit is set, the sequence number is describing part of a sequenced packet, not the entire packet. The bytes that are wanted from that packet are described by the two compact numbers that follow the sequence number word.

Bit 2: Want Sequenced

This bit indicates whether or not the group of data described by this flag should be sequenced and cached by the receiver. If the bit is set, the receiver must cache and sequence the data described in this datagroup. The data described can be either raw data or data described by a sequence. If it is data described by a sequence it must be decoded before the entry is made into the cache. If the bit is clear, no entry is made for this datagroup in the receivers cache.

Bit 1: Want Packet Sequenced

This bit only applies to the first flag in the packet. If it is set, the entire packet should first be decoded and then entered into the receivers cache. It is important that the packet be scanned and any entries requested within the packet be created before the packet itself is sequenced.

Bits 0: Reserved

Set to zero.

As an example, the encoding, transmission, and decoding of a packet will be explained for a packet in the AppleTalk networking protocol. For more information, see *Technical Introduction to the Macintosh Family*, Chapter 9: The Macintosh Operating System, pages 181-183, AppleTalk Network Architecture. See also, *Inside AppleTalk*, by the Apple Programmers' and Developers Association.

This example traces a NBP Lookup packet as it is retransmitted and it's ID changes. NBP is the AppleTalk Name Binding Protocol. AppleTalk Remote Access protocol expects the LAP (Link Access Protocol) source and destination fields to be zeroed. It also expects the length byte to be zeroed on transmission, this is filled in by the other side after being received. We will assume that no packets have yet been transmitted. The "A" labeled figures, FIG. 2A through FIG. 5A, show the disassembly and indexing of the parts of the packets into the buffer at the sender. The "B" labeled figures, FIGS. 2B through 5B, shows the contents of the indexed cache after the disassembly of the first through fourth packets as shown in FIG. 2A through FIG. 5A.

The first NBP Lookup packet to be sent has the following form:

| | |
|---|---|
| LAP/ --> DDP Header | 00 00 02 00 00 00 00 11 11 22 22 11 22 02 FE 02 |
| NBP Func & ID --> | 21 74 |
| NBP Tuple --> | 22 22 22 FE 00 01 = 09 AFPServer 01 * |

FIG. 2A shows the disassembly of the first AppleTalk NBP Lookup packet. FIG. 2B shows the contents of the indexed cache after the disassembly of the first packet as shown in FIG. 2A. Since this is the first packet being sent there is not an entry for it or any of it's parts in our sender's buffer. Therefore, an entry is created for the entire packet with sequence number 0, and we set the datagroup flag to indicate that the receiver should also create an entry in it's buffer when it receives this packet. We also separate the interesting parts of the packet. In this particular case they are the LAP/DDP Header combined, the NBP Tuple, and of course the entire packet. These portions will give us the possibility to match all or part of a subsequent similar packet. The resulting packet to be sent is simply a flag followed by the raw data in this case:

| | |
|---|---|
| DataGroup Flag --> | 52 (PktData, LastGroup, WantPktSeqd) |
| LAP/DDP Header --> | 00 00 02 00 00 00 00 11 11 22 22 11 22 02 FE 02 |
| NBP Func & ID --> | 21 74 |
| NBP Tuple --> | 22 22 22 FE 00 01 = 09 AFPServer 01 * |

We now have one packet sequenced and buffered.

The second NBP Lookup packet, has a new ID, and has the following form:

| | |
|---|---|
| LAP/ --> DDP Header | 00 00 02 00 00 00 00 11 11 22 22 11 22 02 FE 02 |
| NBP Func --> & ID | 21 75 (Note the ID change from 74) |
| NBP Tuple --> | 22 22 22 FE 00 01 = 09 AFPServer 01 * |

FIG. 3A shows the disassembly of the second AppleTalk NBP Lookup packet. FIG. 3B shows the contents of the indexed cache after the disassembly of the second packet as shown in FIG. 3A. This time, the sender checks to see if it already has the entire packet in it's cache and discovers that it does not, since the ID byte has changed. It then checks to see if any portions match, for example the LAP/DDP Header matches. The disassembly unit discovers that it does have a match for that part of the packet in sequence number 0, bytes 0 through 0×0f (hexadecimal). It outputs the appropriate datagroup flag indicating that a token is being sent for that part of the packet. It also creates a new entry into the buffer for this part of the packet, so it will not have to be described as a range in the future, and sets the WantSeqd bit in the datagroup flag—this will be sequence number 1. When it gets to the NBP Function & ID bytes, it simply outputs a datagroup flag that indicates they are raw data. It does not try to index them since they change quite often and it would not save any space to tokenize two bytes. Next, it tries to match the NBP tuple and finds that it has a match for that part of the packet in sequence number 0, bytes 0×12 through 0×24. It also creates a sequence for this portion of the packet and emits the datagroup flag that describes the range found and also indicates to the receiver that it should sequence this part of the packet—this will be sequence number 2. Finally, the entire packet is entered as sequence number 3. The following data to be sent is the result:

| DataGroup Flag —> | 6E | (PktData, Tokenized, Range, WantSeqd, WantPktSeqd) |
|---|---|---|
| Sequence Number —> | 00 00 | |
| Range —> | 80 | 8f (compact numbers for 00 0f) |
| DataGroup Flag —> | 40 | (PktData) |
| Raw Data Len —> | 82 | (compact number for 02) |
| NBP Func & ID —> | 21 74 | (the 2 bytes of raw data) |
| DataGroup Flag —> | 7C | (PktData, Tokenized, LastGroup, Range, WantSeqd) |
| Sequence Number —> | 00 00 | |
| Range —> | 92 A4 | (compact numbers for 12 24) |

The resulting packet is 14 bytes long, and the original packet was 37 bytes long, for a savings of 23 bytes. If yet another NBP Lookup is sent and the NBP ID byte changes once again we get the following third NBP Lookup packet to process:

| LAP/DDP Header —> | 00 00 02 00 00 00 00 11 11 22 22 11 22 02 FE 02 |
|---|---|
| NBP Func & ID —> | 21 76 (Note the ID change from 75) |
| NBP Tuple —> | 22 22 22 FE 00 01 = 09 AFPServer 01 * |

FIG. 4A shows the disassembly of the third AppleTalk NBP Lookup packet. FIG. 4B shows the contents of the indexed cache after the disassembly of the third packet as shown in FIG. 4A. The sender will once again go through the process of attempting to match the packet. It will not find the entire packet match since the NBP ID changed again. It will find a match for the LAP/DDP Header, but this time it will find the match in sequence number 1, the sequence it created for this portion of the packet from the second NBP Lookup packet. The advantage at this time is that this sequence exactly describes the part of the packet it is looking for, and will be able to describe it without the range bytes. We then output a raw data description for the NBP Function and ID bytes. Then we come to the NBP tuple which is matched with sequence number 2. Again, this is a direct match so we don't need the range bytes. Finally, the entire packet is sequenced as sequence number 4. The resulting data for transmission is:

| DataGroup Flag —> | 62 | (PktData, Tokenized, WantPktSeqd) |
|---|---|---|
| Sequence Number —> | 00 01 | |
| DataGroup Flag —> | 40 | (PktData) |
| Raw Data Len —> | 82 | (compact number for 02) |
| NBP Func & ID —> | 21 74 | (the 2 bytes of raw data) |
| DataGroup Flag —> | 70 | (PktData, Tokenized, LastGroup) |
| Sequence Number —> | 00 02 | |

This time we were able to describe the packet in only 10 bytes.

Finally, let's assume that the sender needs to resend the above packet with no change. We get the following fourth NBP Lookup packet to be processed:

| LAP/DDP Header —> | 00 00 02 00 00 00 00 11 11 22 22 11 22 02 FE 02 |
|---|---|
| NBP Func & ID —> | 21 76 (Note same as above) |
| NBP Tuple —> | 22 22 22 FE 00 01 = 09 AFPServer 01 * |

FIG. 5A shows the disassembly of the fourth AppleTalk NBP Lookup packet. FIG. 5B shows the contents of the indexed cache after the disassembly of the fourth packet as shown in FIG. 5A. This time the transmitter will check to see if it can match the entire packet and discover that it does have a match in sequence number 4. Therefore, it can describe the packet as being made up of only one sequence, and the following data to be transmitted results:

| DataGroup Flag —> | 70 | (PktData, Tokenized, LastGroup) |
|---|---|---|
| Sequence Number —> | 00 04 | |

As you can see we were able to describe the original 37 byte packet in only 3 bytes. Typically with NBP traffic, we would reach this stage after only 2 packets because the NBP ID does not normally change with each packet sent. Therefore, with typical traffic between and sender and receiver, the amount of data to be transmitted is reduced by the use of indexed caches at the sender and receiver.

Therefore, from this example we can see how data transmissions are reduced by forming and maintaining indexed caches to the data which has been sent. Other embodiments and variations of this invention will be apparent to one skilled in the art from a consideration of the specification, drawings, and claims. It is intended that the scope of the invention be limited only by the scope of the following claims.

I claim:

1. An apparatus for reducing unnecessary repetition of data transmission between a sender unit and receiver unit, by storing data in both the sender unit and receiver unit upon a first appearance of the data, and then on a later appearance of the same data, reducing data transmission by recalling at the receiver unit the previously stored data rather than retransmitting the data between the sender unit and receiver unit, comprising:

a sender unit having a disassembly unit, sender buffer, sequence number generator, encoder, and modulator;

said disassembly unit for processing an input data stream within said sender unit and separating said input data stream into portions to be stored and transmitted, portions not to be transmitted since they have been previously stored, and portions to be transmitted without storage;

said sender buffer coupled to said disassembly unit to store said portions to be stored;

said sequence number generator coupled to said disassembly unit and said sender buffer to generate sequence numbers as an index of said portions to be stored;

said encoder coupled to said disassembly unit to encode said input stream into a data stream to be transmitted having any of the following, a first flag followed by data portions to be stored, a second flag indicating that data will not follow and should be recalled from data previously stored, and a third flag followed by data to be used directly and which is not stored;

said modulator coupled to said encoder to impress said data stream to be transmitted onto a transmission line; and a receiver unit having a demodulator, a decoder, a receiver buffer, a sequence number generator, and an assembly unit;

said demodulator coupled to said transmission line for receiving said data stream to be transmitted;

said decoder coupled to said demodulator for recognizing said first, second, and third flag values and directing respectively data to be stored, data to be recalled from data previously stored, and data to be used directly and which is not stored;

said receiver buffer coupled to said decoder to store said data to be stored;

said sequence number generator coupled to said decoder and said receiver buffer to generate sequence numbers as an index of said data to be stored; and said assembly unit coupled to said decoder and said receiver buffer for constructing an output data stream within said receiver unit composed of said data to be stored, said data recalled from data previously stored in said receiver buffer, and said data to be used directly and which is not stored.

2. A method of reducing unnecessary repetition of data transmission between a sender unit and receiver unit, by storing data in both the sender unit and receiver unit upon a first appearance of the data, and then on a later appearance of the same data, reducing data transmission by recalling at the receiver unit the previously stored data rather than retransmitting the data between the sender unit and receiver unit, comprising the steps of:

at the sender unit, encoding data to be sent into datagroups, each datagroup having a flag and associated data, said encoding being performed as follows;

a first data pattern of said data to be sent being stored in a sender buffer at a sequence number and encoded into a datagroup having a first flag value followed by said first data pattern, and reappearances of said first data pattern in said data to be sent being encoded into a second flag value followed by said sequence number of the said first data pattern in said sender buffer;

transmitting said datagroups from said sender unit to said receiver unit;

at the receiver unit, receiving said datagroups and for each datagroup, decoding the flag values and performing the indicated operations on said associated data, said decoding being performed as follows;

flags having said first flag value causing said associated data to be placed as stored data in a receiver buffer at a sequence number; and flags having said second flag value followed by said sequence number recalling said stored data from said receiver buffer at said sequence number; and said stored and recalled data being combined to form an output data stream at said receiver unit.

3. A method of reducing unnecessary repetition of data transmission between a sender unit and receiver unit, by storing data in both the sender unit and receiver unit upon a first appearance of the data, and then on a later appearance of the same data, reducing data transmission by recalling at the receiver unit the previously stored data rather than retransmitting the data between the sender unit and receiver unit, comprising the steps of:

determining a largest buffer size available at both the sender unit and receiver unit;

at the sender unit, establishing a sender buffer indexed by consecutive sequence numbers and initializing an initial sequence number to zero;

at the receiver unit, establishing a receiver buffer indexed by consecutive sequence numbers and initializing an initial sequence number to zero;

at the sender unit, generating an input data stream to be transmitted to the receiver unit;

separating the input data stream into datagroups each having a flag and associated data; p1 a first flag value indicating the associated data is stored into the sender buffer and that at the receiver unit the associated data is to be stored into the receiver buffer as well as directed to be used in an output data stream;

a second flag value indicating that the associated data contains a sequence number at which data can be recalled from the receiver buffer for use in the output data stream;

transmission of the datagroups between the sender unit and receiver unit; and at the receiver unit, decoding of datagroup flag values and assembly of the output data stream from data which was associated data which followed a first flag value, and data which was recalled from said receiver buffer from previous storage.

4. A method of reducing unnecessary repetition of data transmission as in claim 3 wherein said sender buffer and said receiver buffer are kept synchronized by storing the same data in both said buffers under control of said flag values generated at said sender unit and transmitted to said receiver unit as said data transmission continues.

* * * * *